US011673682B2

(12) United States Patent
Schimmels et al.

(10) Patent No.: US 11,673,682 B2
(45) Date of Patent: Jun. 13, 2023

(54) VEHICLE HEAT EXCHANGER SYSTEM INCLUDING AN INFLATABLE MEMBER OPERABLE TO PRESS A COOLING TUBE

(71) Applicant: General Electric Company, Schenectady, NY (US)

(72) Inventors: Scott Alan Schimmels, Miamisburg, OH (US); Jeffrey Douglas Rambo, Mason, OH (US); Thomas Kupiszewski, Liberty Township, OH (US); Paul Alexander Intemann, Fort Thomas, KY (US); Robert Proctor, Mason, OH (US)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 16/941,730

(22) Filed: Jul. 29, 2020

(65) Prior Publication Data

US 2021/0031937 A1 Feb. 4, 2021

Related U.S. Application Data

(60) Provisional application No. 62/879,771, filed on Jul. 29, 2019.

(51) Int. Cl.
*B64D 33/12* (2006.01)
*B64C 1/34* (2006.01)
(52) U.S. Cl.
CPC ............... *B64D 33/12* (2013.01); *B64C 1/34* (2013.01)
(58) Field of Classification Search
CPC .. B64D 33/12; B64C 1/34; B64C 1/38; F28D 7/0041; F28D 2021/0021; F28F 1/22

USPC ....................................................... 244/117 R
See application file for complete search history.

(56) References Cited

U.S. PATENT DOCUMENTS

| 3,438,602 | A |   | 4/1969 | Noddings et al. |
|---|---|---|---|---|
| 3,785,591 | A |   | 1/1974 | Stalmach, Jr. |
| 4,346,643 | A | * | 8/1982 | Taylor ..................... F41A 21/44 165/104.26 |
| 4,671,348 | A |   | 6/1987 | Bauer |
| 4,800,952 | A | * | 1/1989 | Kirpich .................... G21D 5/02 137/340 |

(Continued)

FOREIGN PATENT DOCUMENTS

| CN | 100510604 C | 7/2009 |
|---|---|---|
| WO | WO03/071616 A2 | 8/2003 |

OTHER PUBLICATIONS

European Search Report Corresponding to Application No. 20186964 dated Dec. 15, 2020.

(Continued)

*Primary Examiner* — Brady W Frazier
(74) *Attorney, Agent, or Firm* — Dority & Manning, P.A.

(57) ABSTRACT

A vehicle is provided including a structure including a skin defining an outside surface exposed to ambient cooling flow and an inside surface. The structure includes a first structural member extending from the inside surface of the skin and a second structural member extending from the inside surface of the skin; and a thermal management system including a heat exchanger assembly positioned adjacent to, and in thermal communication with, the inside surface of the skin, the heat exchanger assembly positioned at least partially between the first and second structural members of the structure.

20 Claims, 11 Drawing Sheets

(56) References Cited

U.S. PATENT DOCUMENTS

| | | | |
|---|---|---|---|
| 4,807,831 A | 2/1989 | Brewer et al. | |
| 4,966,229 A | 10/1990 | Senterfitt et al. | |
| 4,986,495 A | 1/1991 | Stromath et al. | |
| 5,228,643 A | 7/1993 | Manda et al. | |
| 5,423,498 A * | 6/1995 | Fluegel | B64D 13/00 165/41 |
| 5,511,613 A * | 4/1996 | Mohn | F28F 1/02 165/906 |
| 5,667,168 A * | 9/1997 | Fluegel | B64D 13/00 165/169 |
| 5,687,932 A | 11/1997 | Gomes | |
| 5,702,073 A | 12/1997 | Fluegel | |
| 6,698,687 B2 | 3/2004 | Daggett | |
| 7,952,873 B2 | 5/2011 | Glahn et al. | |
| 8,602,088 B2 | 12/2013 | Solntsev et al. | |
| 9,309,000 B2 * | 4/2016 | Piesker | B64D 13/06 |
| 9,434,465 B2 | 9/2016 | Pelissier | |
| 9,598,974 B2 | 3/2017 | Gekht et al. | |
| 9,657,954 B2 | 5/2017 | Flashaar et al. | |
| 9,939,203 B2 | 4/2018 | Cho et al. | |
| 10,011,326 B2 | 7/2018 | Hey et al. | |
| 10,059,435 B2 | 8/2018 | Daggett et al. | |
| 2007/0209729 A1 * | 9/2007 | Tomerlin | F16L 11/10 138/133 |
| 2008/0302910 A1 * | 12/2008 | Calamvokis | B64D 15/12 244/118.5 |
| 2009/0159746 A1 | 6/2009 | Grauerholz | |
| 2011/0186263 A1 * | 8/2011 | Piesker | B64D 13/00 165/47 |
| 2013/0009007 A1 | 1/2013 | Tomasi et al. | |
| 2016/0031562 A1 | 2/2016 | Mores et al. | |
| 2018/0066583 A1 | 3/2018 | Menheere et al. | |
| 2018/0273187 A1 | 9/2018 | Vinke et al. | |
| 2019/0010866 A1 | 1/2019 | Snyder et al. | |
| 2019/0017645 A1 | 1/2019 | Fiedler et al. | |
| 2019/0118957 A1 | 4/2019 | Thomassin et al. | |

OTHER PUBLICATIONS

Fluorotherm, Fluoroplymer Tubing, Thermally Conductive H2 Tubing, 5 pages. www.fluorotherm.com/products/fluoropolymer-tubing/h2-tubing/.

* cited by examiner

VEHICLE HEAT EXCHANGER SYSTEM INCLUDING AN INFLATABLE MEMBER OPERABLE TO PRESS A COOLING TUBE

CROSS-REFERENCE TO RELATED APPLICATIONS

This application is a non-provisional application claiming the benefit of priority under 35 U.S.C. § 119(e) to U.S. Provisional Application No. 62/879,771, filed Jul. 29, 2019, which is hereby incorporated by reference in its entirety.

FIELD

The present subject matter relates generally to a thermal management system for a vehicle utilizing an ambient airflow over a skin of the vehicle as a heat sink.

BACKGROUND

At least certain vehicles generate a relatively large amount of heat during operation. For example, at least certain aircraft generate a relatively large amount of heat during operation of its thrust generating systems, such as during operation of one or more gas turbine engines, electric motors and generators, etc., as well as through other flight-enabling accessory systems, such as hydraulic systems, electronic systems, etc.

In order to reject a desired amount of such heat, certain aircraft include ram air coolers, externally mounted coolers, etc. However, such coolers may create additional drag on the aircraft, such as an additional amount of parasitic drag. Accordingly, an aircraft or other vehicle including a thermal management system having one or more features for rejecting heat without increasing a drag on the vehicle would be useful.

BRIEF DESCRIPTION

Aspects and advantages of the invention will be set forth in part in the following description, or may be obvious from the description, or may be learned through practice of the invention.

In one exemplary aspect of the present disclosure, a vehicle is provided including a structure including a skin defining an outside surface exposed to ambient cooling flow and an inside surface. The structure includes a first structural member extending from the inside surface of the skin and a second structural member extending from the inside surface of the skin; and a thermal management system including a heat exchanger assembly positioned adjacent to, and in thermal communication with, the inside surface of the skin, the heat exchanger assembly positioned at least partially between the first and second structural members of the structure.

In another exemplary embodiment of the present disclosure a thermal management system for a vehicle is provided. The vehicle includes a structure having a skin defining an inside surface. The thermal management system includes a heat exchanger assembly comprising a structural backing and a cooling unit, the structural backing configured to mount the cooling unit in a position adjacent to, and in thermal communication with, the inside surface of the skin, the cooling unit formed of an elastic or semi-rigid material to conform to a shape of the inside surface of the skin.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
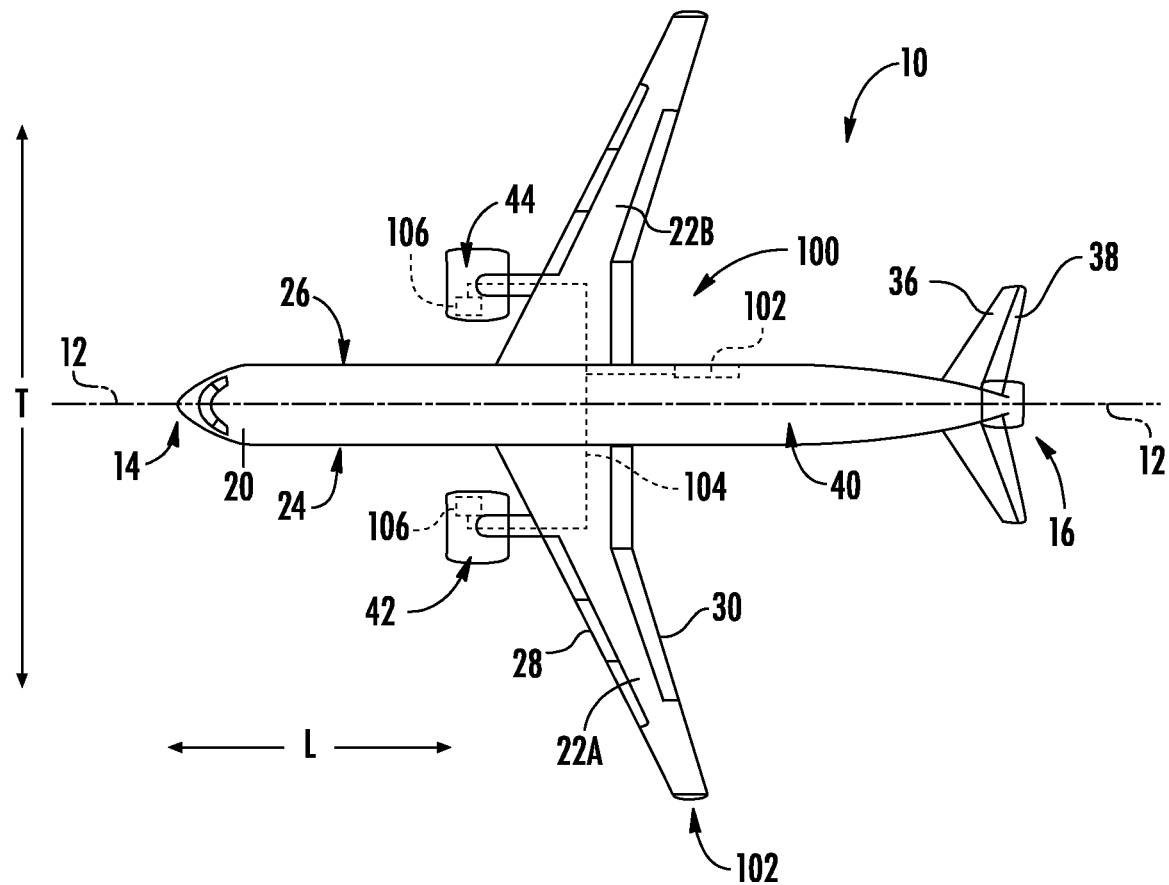
FIG. 1 is a top view of an aircraft in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Figure 2:
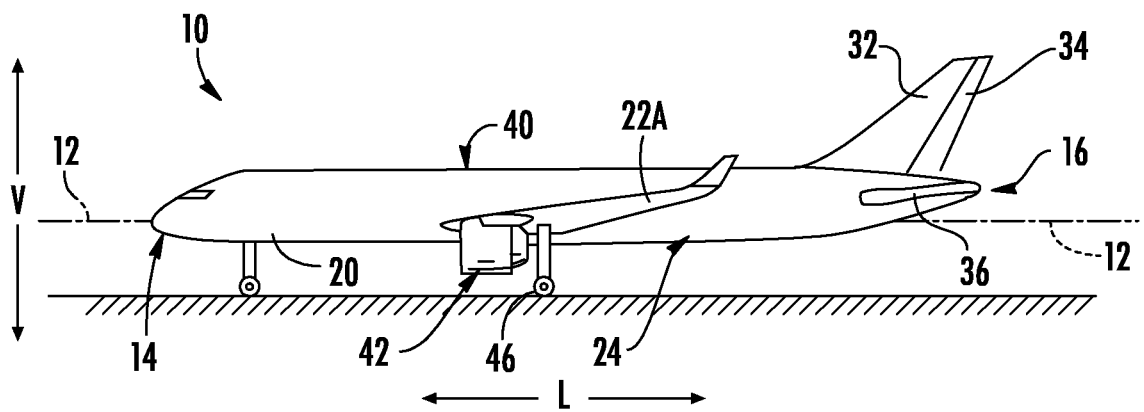
FIG. 2 is a side view of the exemplary aircraft of FIG. 1.

Referring now to the drawings, wherein identical numerals indicate the same elements throughout the Figs., FIG. 1 provides a top view of an exemplary aircraft 10 as may incorporate various embodiments of the present disclosure. FIG. 2 provides a port side 24 view of the aircraft 10 as illustrated in FIG. 1. As shown in FIGS. 1 and 2 collectively, the aircraft 10 defines a longitudinal direction L that extends generally along a longitudinal centerline 12 of the aircraft 10, a vertical direction V, a transverse direction T, a forward end 14, and an aft end 16.

Moreover, the aircraft 10 includes various structures, such as a fuselage 20 extending longitudinally from the forward end 14 of the aircraft 10 towards the aft end 16 of the aircraft 10, and a pair of wings 22, or rather, a first wing 22A and a second wing 22B. The first wing 22A extends outwardly from the fuselage 20 generally along the transverse direction T with respect to the longitudinal centerline 12, from the port side 24 of the fuselage 20. Further, the second wing 22B similarly extends outwardly from the fuselage 20, generally along the transverse direction T with respect to the longitudinal centerline 12, from a starboard side 26 of the fuselage 20. Each of the wings 22A, 22B for the exemplary embodiment depicted includes one or more leading edge flaps 28 and one or more trailing edge flaps 30.

Referring still to the exemplary aircraft 10 of FIGS. 1 and 2, the aircraft 10 further includes additional structures, such as a vertical stabilizer 32 having a rudder flap 34 for yaw control, and a pair of horizontal stabilizers 36, each having an elevator flap 38 for pitch control. Additionally, the aircraft 10 may include structures such as fairings, externally mounted sponsons or pods, tail cones, engine nacelles, etc.

However, it should be appreciated that in other exemplary embodiments of the present disclosure, the aircraft 10 may additionally or alternatively include any other suitable configuration of stabilizers or structures that may or may not extend directly along the vertical direction V or horizontal/transverse direction T. In addition, alternative stabilizers or structures may be any suitable shape, size, configuration, or orientation while remaining within the scope of the present subject matter.

Each of the above structures, such as the fuselage 20, wings 22A, 22B, and stabilizers 23, 36, additionally includes an outer skin 40. The outer skin 40 may be formed of a thin sheet metal, composite material, thermally-conductive composite material, ceramic material, and/or other suitable material.

The exemplary aircraft 10 of FIGS. 1 and 2 also includes a propulsion system. The exemplary propulsion system depicted includes a plurality of aircraft engines, at least one of which mounted to each of the pair of wings 22A, 22B. Specifically, the plurality of aircraft engines includes a first aircraft engine 42 mounted to the first wing 22A and a second aircraft engine 44 mounted to the second wing 22B. In at least certain exemplary embodiments, the aircraft engines 42, 44 may be configured as turbofan jet engines suspended beneath the wings 22A, 22B in an under-wing configuration.

Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc. Further, in still other exemplary embodiments, the propulsion system may include one or more electric, or hybrid-electric, aircraft engines (e.g., electric fans). In any of the above embodiments, the engines may be arranged in any suitable manner (e.g., stabilizer-mounted, fuselage-mounted, etc.).

Further, for the embodiment shown the aircraft 10 additionally includes a thermal management system 100. As is depicted in phantom, the thermal management system 100 includes a heat exchanger assembly 102 positioned adjacent to, and in thermal communication with, an inside surface of the outer skin 40 of the aircraft 10 (as will be explained in more detail below). Moreover, the thermal management system 100 includes a thermal bus 104 and at least one heat source exchanger 106. The heat source exchanger 106 may be located within, proximal to, or otherwise in thermal communication with, an aircraft engine (e.g., engines 42, 44), auxiliary power unit, energy storage unit, environmental control system, electrical power conditioner, aircraft avionics unit, payload avionics unit, etc. More specifically, the exemplary thermal management system 100 depicted includes a plurality of heat source exchangers 106, each of the plurality of heat source exchangers 106 thermally coupled to a heat source of one of the engines 42, 44 (e.g., a lubrication oil heat source, a cooled cooling air heat source, etc.). The thermal bus 104 may transport a thermal fluid from the heat source exchangers 106 to the heat exchanger assembly 102 located adjacent to, and in thermal communication with, the inside surface of the outer skin 40 for rejecting heat from the heat sources of the engines 42, 44 using the heat exchanger assembly 102. In such a manner, the thermal management system 100 may utilize an ambient airflow over an outer surface of the outer skin 42 reject heat from certain heat sources of the aircraft 10.

The "thermal fluid" may be any suitable fluid for transferring thermal energy. For example, in at least certain exemplary embodiments the thermal fluid may be air (which has the benefit of being abundant and can recharge cooling system to offset leakages); gasses other than air; liquids such as water, water-glycol mixtures (to, e.g., prevent freezing), oils including lubrication oil and thermal oils such as Syltherm, Dowtherm, etc.; fuel (allowing for, e.g., fuel cooling through aircraft skin); refrigerants (including CO2, supercritical CO2, and/or any other refrigerant, such as those having an "R" designation from the American Society of Heating, Refrigerating and Air-Conditioning Engineers); functional equivalents of any of the above; and/or combinations of any of the above.

Figure 3:
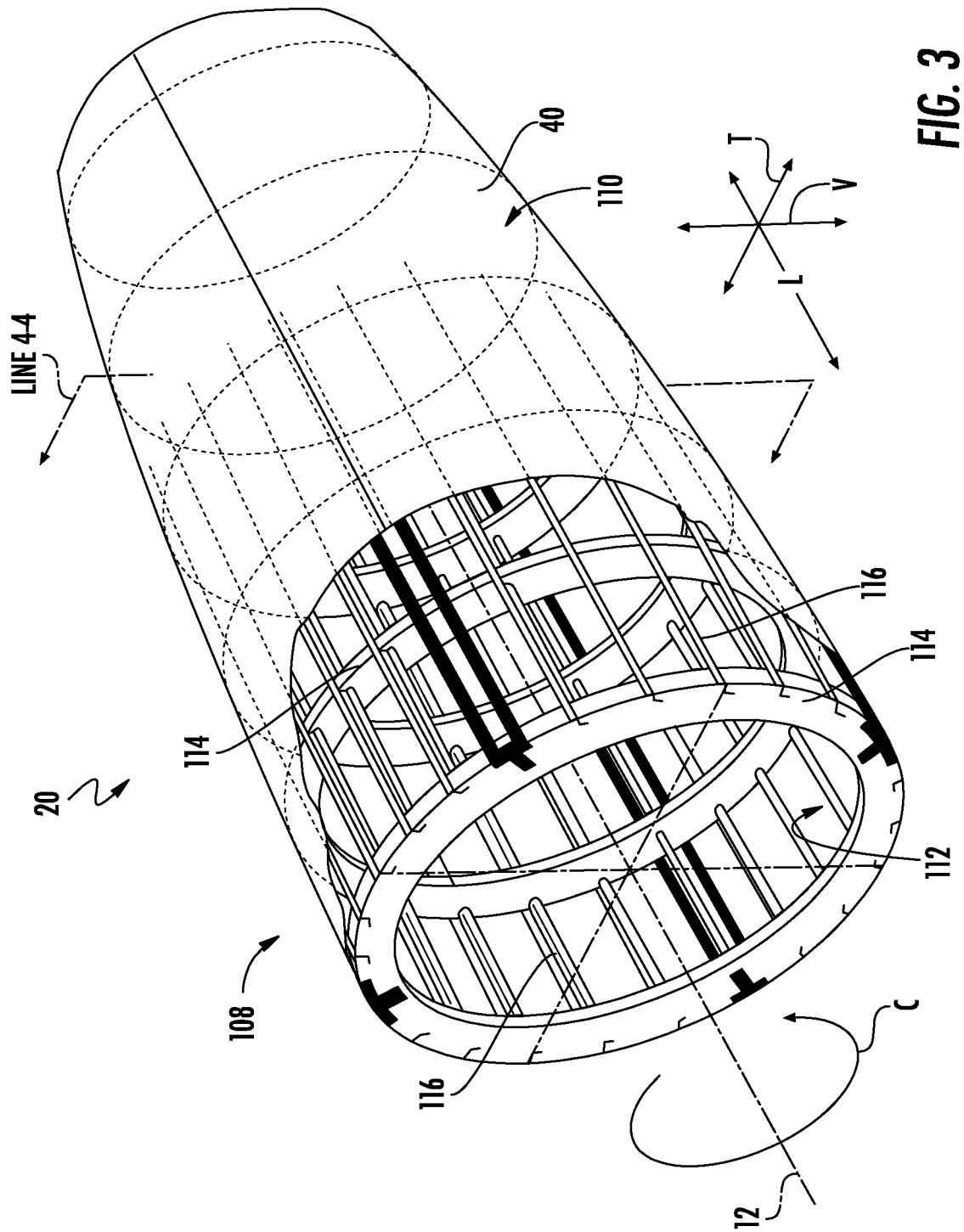
FIG. 3 is cut-a-way, schematic view of a fuselage of the exemplary aircraft of FIGS. 1 and 2.

Referring now to FIG. 3, a partial, schematic, cutaway view of a section of the fuselage 20 of the aircraft 10 10 described above with reference to FIGS. 1 and 2 is provided. As is shown, the fuselage 20 includes the outer skin 40, as well as a frame assembly 108 having a plurality of structural members. The fuselage 20 defines a circumferential direction C extending about the longitudinal centerline 12 of the aircraft 10. Further, the outer skin 40 defines an outside surface 110 exposed to the ambient airflow over the aircraft 10 and an inside surface 112. The plurality of structural members of the frame assembly 108 extend from the inside surface 112 of the outer skin 40. For the embodiment shown, the plurality of structural members of the frame assembly 108 includes a plurality of frame members 114 extending about the longitudinal centerline 12 in the circumferential direction C and spaced from one another along the longitudinal direction L. Additionally, the plurality structural members of the frame assembly 108 includes a plurality longitudinal stiffeners 116 extending generally along the longitudinal direction L. The plurality of longitudinal stiffeners 116 are spaced from one another along the circumferential direction C.

Figure 4:
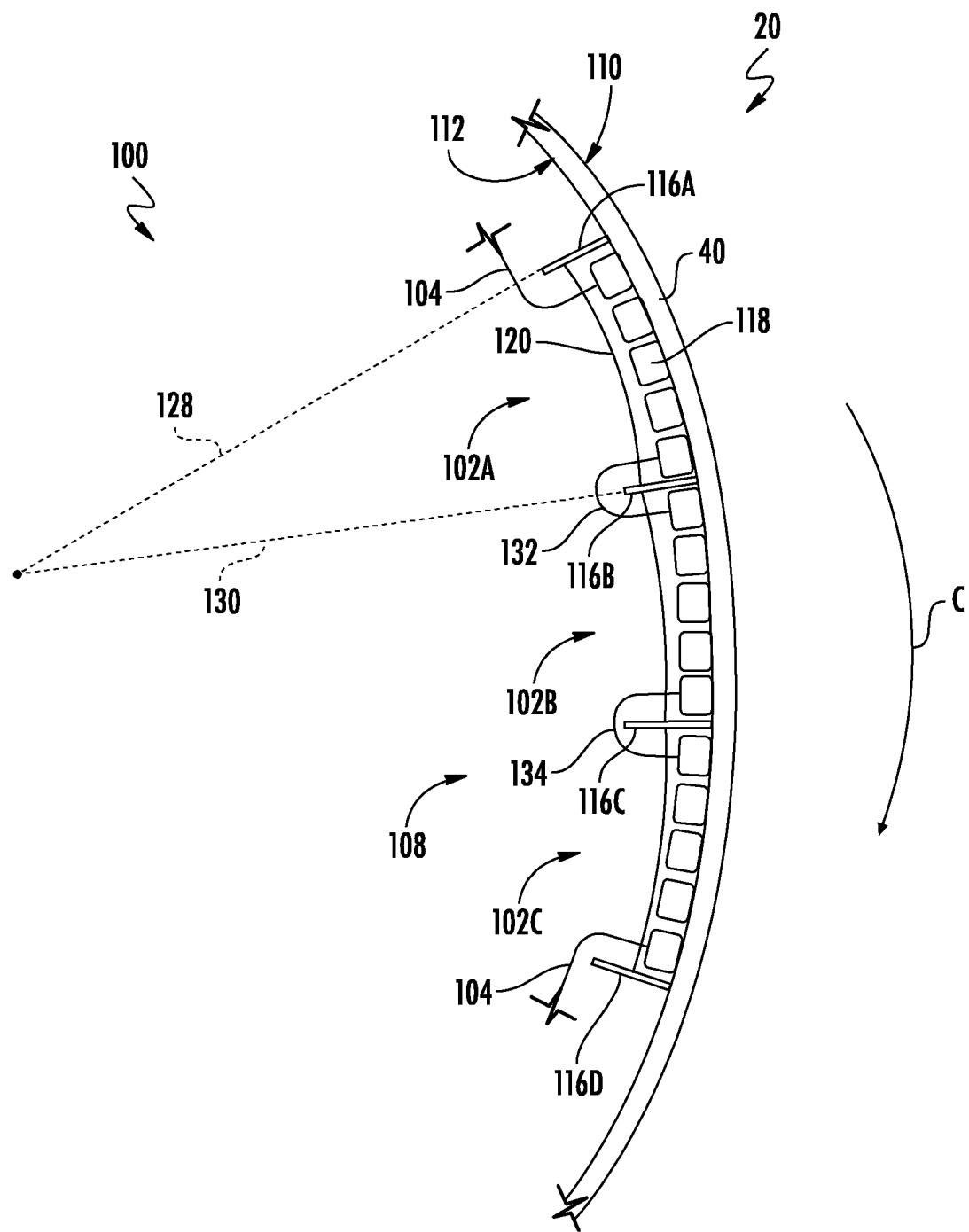
FIG. 4 is a schematic, cross-sectional view of the fuselage of FIG. 3 with a thermal management system in accordance with an exemplary embodiment of the present disclosure.

Referring now to FIG. 4 a schematic, cross-sectional view of the fuselage 20 of FIG. 3 is provided, taken generally along Line 4-4 of FIG. 3. As was noted above, the fuselage 20 generally includes the frame assembly 108 having the plurality structural members extending generally from the inside surface 112 of the outer skin 40. The plurality structural members includes a first structural member, a second structural member, a third structural member, and a fourth structural member. For the embodiment shown, the first structural member is a first longitudinal stiffener 116A, the second structural member is a second longitudinal stiffener 116B, the third structural member is a third longitudinal stiffener 116C, and the fourth structural member is a fourth longitudinal stiffener 116D. Each of these longitudinal stiffeners 116 extends generally along the longitudinal direction L and is spaced from one another generally along the circumferential direction C.

Moreover, as will be appreciated, the thermal management system 100 of the aircraft 10, briefly introduced above, includes the heat exchanger assembly 102 positioned adjacent to, and in thermal communication with, the inside surface 112 of the outer skin 40, and further positioned between the first structural member and the second structural member, or more specifically, between the first longitudinal stiffener 116A and the second longitudinal stiffener 116B.

It will be appreciated, that as used herein, the term "positioned adjacent to, and in thermal communication with" refers to one component either contacting the other component, of being separated only by a small number of intermediate components and/or air gaps not substantially impeding a thermal transfer from one component to the other. For example, as used herein, the term "positioned adjacent to, and in thermal communication with" may allow for, e.g., intermediate thermally conductive tapes or other adhesives, as well as other thermally-conductive compounds (such as wax, grease, etc.) between two components (see, e.g., FIG. 9) and/or air gaps resulting from limitations of commercially practical manufacturing methods (such as air gaps less than about 1 inch, such as less than about 0.5 inches, such as less than about 0.25 inches).

Referring still particularly to the exemplary embodiment shown in FIG. 4, the heat exchanger assembly 102 generally includes a cooling unit and a structural backing 120. For the embodiment shown, the cooling unit is a cooling tube 118. The structural backing 120 mounts the cooling tube 118 in position adjacent to, and in thermal communication with, the inside surface 112 of the outer skin 40. In such a manner, the cooling tube 118 may transfer heat from a thermal fluid flowing therethrough (received from, e.g., the thermal bus 104) across the outer skin 40 to an ambient airflow over the outer skin 40.

It will be appreciated, however, that in other embodiments, the cooling unit of the heat exchanger assembly 102 may be, e.g., a plate defining one or more internal passages, with the the plate having a geometry that is conformal to and attached to the inside surface 112 of the outer skin 40.

More specifically, referring still to the embodiment of FIG. 4, the heat exchanger assembly 102 is coupled to a first structural member, a second structural member, or both. Particularly for the embodiment of FIG. 4, the structural backing 120 is mounted to the first longitudinal stiffener 116A, the second longitudinal stiffener 116B, or both. In particular, for the embodiment shown, the structural backing 120 is mounted to both the first longitudinal stiffener 116A and the second longitudinal stiffener 116B.

Further, for the embodiment shown, the structural backing 120 utilizes a geometry of the first longitudinal stiffener 116A and second longitudinal stiffener 116B to mount the thermal heat exchanger assembly 102. For example, referring now also to FIG. 5, providing a close-up, schematic view of the heat exchanger assembly 102 mounted to the outer skin 40, it will be appreciated that the outer surface of the fuselage 20 defines a generally circular or ovular shape. As such, the local region of the outer skin 40 depicted in FIGS. 4 and 5 generally defines an arcuate shape. The longitudinal stiffeners 116 extend generally from the inside surface 112 of the outer skin 40 in a generally perpendicular manner, such that the longitudinal stiffeners 116 are not parallel to one another.

More particularly, the first and second longitudinal stiffeners 116A, 116B are slanted towards one another as they extend from the inside surface 112 of the outer skin 40. Referring particularly to FIG. 4, the first longitudinal stiffener 116A defines a first reference line 128 extending away from the inside surface 112 of the outer skin 40 and the second longitudinal stiffener 116B defines a second reference line 130 extending away from the inside surface 112 of the outer skin 40. The first and second reference lines 128, 130, which are each straight lines, are not parallel to one another, and instead converge towards one another such that they contact one another.

Figure 5:
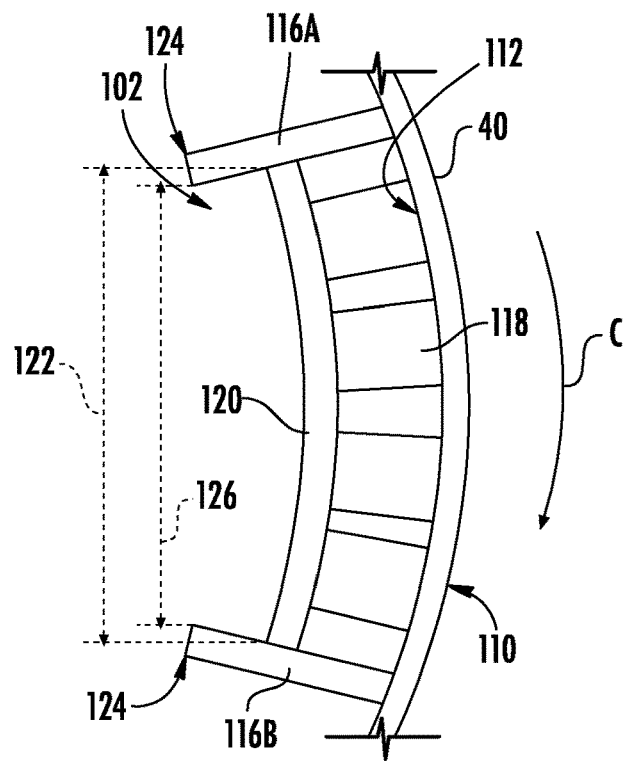
FIG. 5 is a close-up, schematic view of a portion of the fuselage and thermal management system of FIG. 4.

Further, referring particularly to FIG. 5, the first and second longitudinal stiffeners 116A, 116B define a separation distance 122 between their distal ends 124 (which is greater than a separation distance at their respective bases proximate the inside surface 112 of the outer skin 40; not labeled). Further, the structural backing 120 defines a length 126. The length 126 of the structural backing 120 is greater than the separation distance 122 defined between the distal ends 124 of the first and second longitudinal stiffeners 116A, 116B.

In such a manner, the structural backing 120 of the heat exchanger assembly 102 may be fixed at least partially between the first longitudinal stiffener 116A and second longitudinal stiffener 116B for mounting the heat exchanger assembly 102. More specifically, the structural backing 120 may be wedged into place to mount the heat exchanger assembly 102.

It will be appreciated, however, that in other exemplary embodiments, the structural backing 120 instead be fixed to the longitudinal stiffeners 116, or other structural features (such as the frame members 114) of the frame assembly 108 of the fuselage 20 (or other structure of the aircraft 10) in any other suitable manner, such as through a suitable bolting, clamping, bonding, or other suitable attachment means.

Referring still to FIG. 4, it will be appreciated that for the embodiment shown, the thermal management system 100 further includes a plurality of heat exchanger assemblies 102. In particular, the above-described heat exchanger assembly 102 is a first heat exchanger assembly 102A, and the thermal management system 100 further includes a second heat exchanger assembly 102B and a third heat exchanger assembly 102C. The second heat exchanger assembly 102B is positioned adjacent to, and in thermal communication with, the inside surface 112 outer skin 40 at a location between the second longitudinal stiffener 116B and third longitudinal stiffener 116C, and the third heat exchanger assembly 102C is positioned adjacent to, and in thermal communication with, the inside surface 112 of the outer skin 40 at a location between the third longitudinal stiffener 116C and the fourth longitudinal stiffener 116D. For the exemplary embodiment shown, the first exchanger assembly is fluidly coupled to the second heat exchanger assembly 102B through a first jumper line 132, and similarly, the third heat exchanger assembly 102C is fluidly coupled to the second heat exchanger assembly 102B through a second jumper line 134. In such a manner, it will be appreciated that the first heat exchanger assembly 102A, the second heat exchanger assembly 102B, and the third heat exchanger assembly 102C are arranged in serial flow order.

However, in other exemplary embodiments, one or more of the first heat exchanger assembly 102A, the second heat exchanger assembly 102B, and the third heat exchanger assembly 102C may instead be arranged in a parallel flow order or a combination of parallel and series flow order. Further, in other exemplary embodiments, the thermal management system 100 may include any suitable number of heat exchanger assemblies 102, such as one, two, four, etc.

Figure 6:
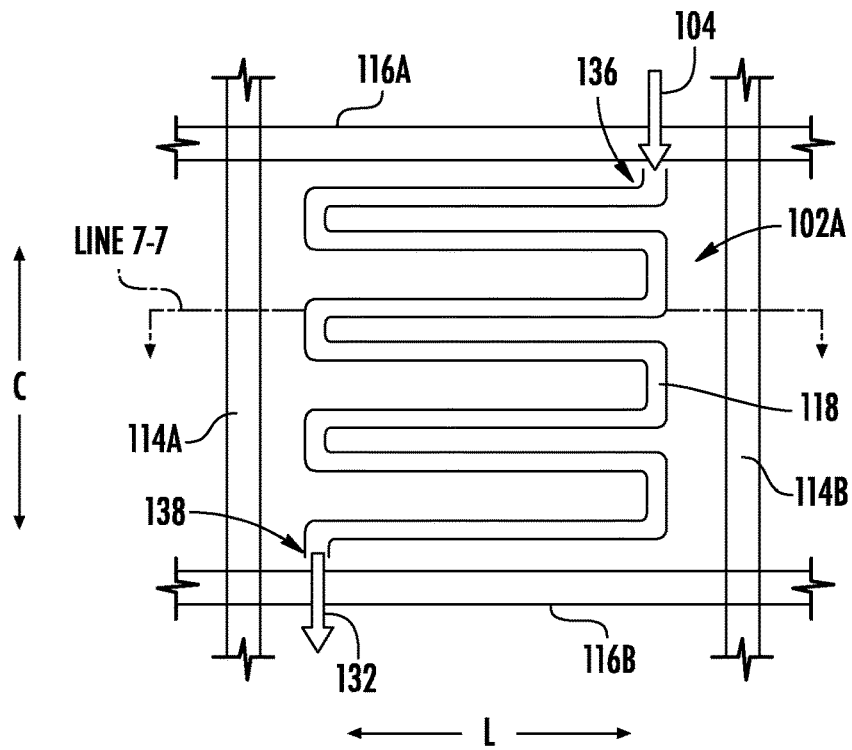
FIG. 6 is a close-up, plan view of a portion of the fuselage and thermal management system of FIG. 4.

Further, referring briefly to FIG. 6, a plan view of a portion of the first heat exchanger assembly 102A is depicted. Specifically, FIG. 6 depicts the cooling tube 118 of the first heat exchanger assembly 102A. The structural backing 120 of the first heat exchanger assembly 102A is removed for clarity. As is shown, the cooling tube 118 of the first heat exchanger assembly 102A extends in a serpentine path in order to, e.g., maximize a contact with the inside surface 112 of the outer skin 40. The cooling tube 118 defines an inlet 136 and an outlet 138. The inlet 136 may be in flow communication with the thermal bus 104 (see, e.g., FIG. 1), and the outlet 138 may be in flow communication with, e.g., the first jumper line 132.

For the embodiment depicted in FIG. 6, it will be appreciated that the first heat exchanger assembly 102A is positioned generally between the first longitudinal stiffener 116A and the second longitudinal stiffener 116B, as well as between a first frame member 114A and a second frame member 114B, spaced along the longitudinal direction L.

Figure 7:
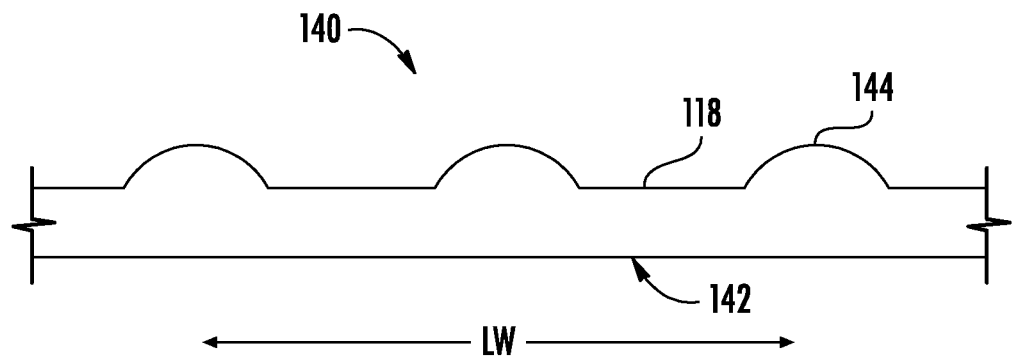
FIG. 7 is a schematic, cross-sectional view of a cooling tube of a heat exchanger assembly of a thermal management system in accordance with an exemplary embodiment of the present disclosure.

Moreover, referring now to FIG. 7, a cross-sectional view of a portion of the fuel cooling tube 118 of the first heat exchanger assembly 102A is depicted, taken along Line 7-7 in FIG. 6. As is shown, the portion of the cooling tube 118 depicted extends along a lengthwise direction LW and defines a first side 140 proximate the inside surface 112 of the outer skin 40 and a second side 142 opposite the first side 140. For the embodiment shown, the cooling tube 118 defines a plurality of nonlinear features spaced along the lengthwise direction LW of the first side 140. The nonlinear features may assist with creating increased heat transfer between the thermal fluid flowing through the cooling tube 118 and the outer skin 40 of the aircraft 10, and thus between the thermal fluid flowing through the cooling tube 118 and an ambient airflow over the outer surface of the aircraft 10.

For the embodiment of FIG. 7, the nonlinear features include a plurality of dimples 144 having a generally semi-circular shape. However, in other exemplary embodiments, any other suitable nonlinear features may be provided to enhance thermal transfer. For example, In other exemplary embodiments, the cooling tube 118 may include any suitable combination of turbulators, dimples, grooves (such as spiral grooves), etc.

Notably, for the embodiment of FIG. 7, each of the plurality of nonlinear features are positioned on the first side 140 of the cooling tube 118 proximate the inside surface 112. It will be appreciated, however, that in other embodiments, the cooling tube 118 may have any other suitable non-linear feature arranged in any suitable manner, and positioned at any other suitable location. For example, in other embodiments, the cooling tube 118 may further include nonlinear features on the second side 142 of the cooling tube 118, or elsewhere.

It will be appreciated, that as used herein, the term "nonlinear feature," with reference to the cooling tube 118, refers to any section, or portion, of the cooling tube 118 that does not extend substantially linearly along the lengthwise direction LW of the cooling tube 118.

In order to form the cooling tube 118 having such nonlinear features, the cooling tube may be additively manufactured, also known as 3-D printed. However, in other embodiments, the cooling tube 118 may not be additively manufactured, and instead may be formed in any suitable manner, such as by metal sheet stamping and diffusion bonding.

Figure 8:
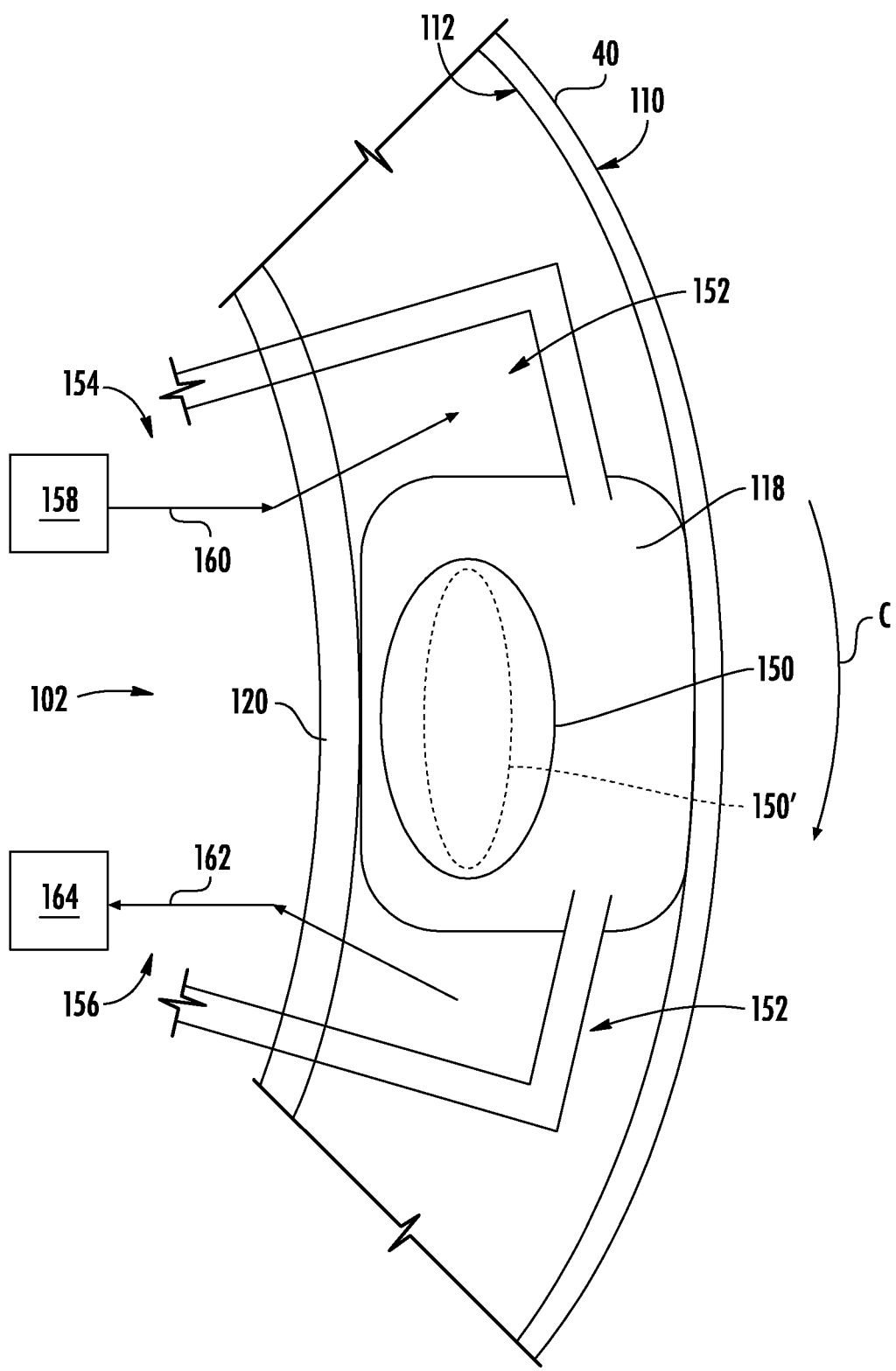
FIG. 8 is a schematic, cross-sectional view of a heat exchanger assembly of a thermal management system in accordance with an exemplary embodiment of the present disclosure.

Referring now to FIG. 8, a close-up, cross-sectional view of a heat exchanger assembly 102 in accordance with an embodiment of the present disclosure is provided. The heat exchanger assembly 102 of FIG. 8 is depicted in the same viewing plane as the heat exchanger assembly 102 described above with reference to FIG. 4.

In certain embodiments, the heat exchanger assembly 102 of FIG. 8 may be configured in substantially the same manner as the exemplary heat exchanger assembly 102 described above with reference to FIG. 4. For example, as is shown, the heat exchanger assembly 102 generally includes a structural backing 120 and a cooling unit. For the embodiment depicted, the cooling unit is a cooling tube 118. The cooling tube 118 is mounted by the structural backing 120 adjacent to, and in thermal communication with, the inside surface 112 of the outer skin 40 of the vehicle. Further, the cooling tube 118 is configured to flow a thermal fluid therethrough to transfer heat from the thermal fluid through the outer skin 40 of the vehicle to an ambient airflow over the outer skin 40 of the vehicle.

As will be appreciated from the view of FIG. 8, the inside surface 112 of the outer skin 40 the vehicle defines a nonplanar geometry, such as an arcuate geometry. In order to maximize a heat transfer from the thermal fluid through the cooling tube 118 to the outer skin 40 of the vehicle, the cooling tube 118 is configured to form to a geometry of the inside surface 112 of the outer skin 40. As such, the cooling tube 118 is formed of a flexible or semirigid material.

For example, in the embodiment depicted, the cooling tube 118 is formed of a composite having an additive for increased thermal conductivity. For example, the cooling tube 118 may be formed of a filled polymer material. The term "filled polymer" refers to a natural or synthetic polymeric material having thermally conductive particles therein to allow a desired amount of heat transfer across the material. For example, the cooling tube 118 may be formed of a polymer, such as rubber, having aluminum particles, iron particles, magnesium oxide particles, aluminum nitride particles, boron nitride particles, diamond dust, carbon dust, carbon nanotubes, carbon fiber filaments, or a combination thereof, therein. Further, it will be appreciated that as used herein, that the term "flexible or semi-rigid," as used to describe the cooling tube 118, refers to being formed of a material capable of at least partially elastically deforming to conform to a geometry of the inside surface 112 of the outer skin 40 when the heat exchanger assembly 102 is installed.

As such, the cooling tube 118 may be formed of a material capable of conforming to the geometry of the inside surface 112 of the skin 40, while still being capable of transferring a desired amount of heat from the thermal fluid flowing therethrough to the skin 40.

Further, referring still to FIG. 8, in order to provide the desired contact between the cooling tube 118 and the inside surface 112 of the outer skin 40, the heat exchanger assembly 102 further includes an inflatable member 150 operable with the cooling tube 118 to press the cooling tube 118 towards the inside surface 112 of the outer skin 40. Specifically, for the embodiment shown, the inflatable member 150 is an inflatable bladder positioned at least partially within the cooling tube 118. The inflatable bladder may run lengthwise within cooling tube 118 (e.g., along the lengthwise direction LW of the cooling tube 118, as is depicted in FIG. 7).

In at least certain exemplary embodiments, the inflatable bladder may receive a compressed gas flow once the heat exchanger assembly 102 is installed to press the cooling tube 118 towards the inside surface 112 of the outer skin 40. In such a manner, it will be appreciated that in at least certain exemplary aspects, inflatable bladder may be at least partially deflated (as is depicted in phantom FIG. 8 as 150') when the heat exchanger assembly 102 is installed, allowing for increased ease of installation. Further, in at least certain exemplary aspects, the inflatable member 150 may be deflated during certain operational conditions, non-operational conditions, and/or maintenance activities. Such may protect the outer skin 40 and may further allow for increase ease of such maintenance activities.

The pressurized gas flow provided to the inflatable bladder may come from, e.g., an engine bleed, an onboard gas container, a refrigerant bleed from a vapor-compression cycle refrigeration unit, a ground source, etc. The temperature of the pressurized gas flow may be reduced by some means such as a heat exchanger, throttling process, or other precooling means to further assist with a cooling of a thermal fluid through the heat exchanger assembly 102. In at least certain exemplary embodiments, the inflatable bladder may extend substantially along the entire length of the cooling tube 118 (e.g., substantially along the entire length between an inlet 136 and an outlet 138 of the cooling tube 118; see, e.g., FIG. 6).

Notably, inflating the inflatable bladder once the heat exchanger assembly 102 is installed may further assist with the mounting of the heat exchanger assembly 102, and further wedging the structural backing 120 between adjacent longitudinal stiffeners 116.

Referring still FIG. 8, it will be appreciated that the thermal management system 100 may additionally include certain additional features for further removing heat from the thermal transfer fluid flowing through the cooling tube 118. Specifically, for the embodiment shown, thermal management system 100, or rather, the heat exchanger assembly 102, further defines a cooling air flowpath 152 adjacent to, and in thermal communication with, the cooling tube 118. For the embodiment shown, the cooling air flowpath 152 is defined by the structural backing 120, the cooling tube 118, the inside surface 112 of the outer skin 40, or combination thereof. Specifically, for the embodiment shown, the cooling air flowpath 152 is defined by each of the structural backing 120, the cooling tube 118, and the inside surface 112 of the outer skin 40. Further, the thermal management system 100 comprises a cooling airflow delivery system 154 and a cooling airflow exhaust system 156. In at least certain exemplary embodiments, the cooling airflow delivery 154 system includes a cooling airflow source 158 and a cooling airflow delivery conduit 160. The cooling airflow source 158 may be, e.g., a cabin air source or other suitable relatively cool airflow source. Further, the cooling airflow exhaust system 156 generally includes a cooling airflow exhaust conduit 162 and a cooling airflow sink 164. The cooling airflow sink 164 may be, e.g., an exhaust to an ambient location.

Alternatively, in other embodiments, the cooling airflow exhaust 164 may be in airflow communication with the cooling airflow source 158 through, e.g., an airflow heat exchanger. In such an embodiment, the cooling airflow channels 152 may be configured as a closed loop airflow cooling system.

Figure 9:
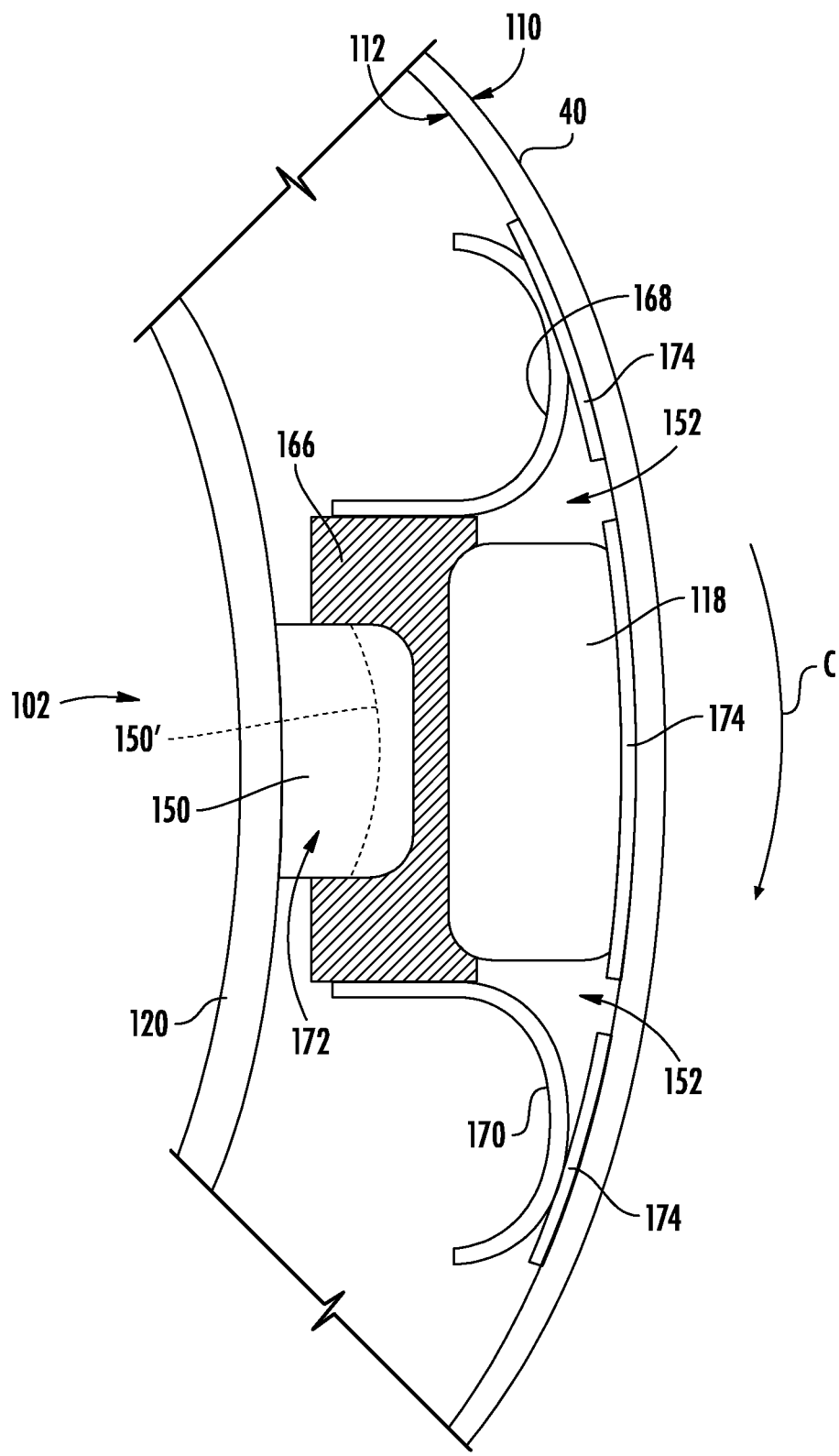
FIG. 9 is a schematic, cross-sectional view of a heat exchanger assembly of a thermal management system in accordance with another exemplary embodiment of the present disclosure.

It will be appreciated, however, that in other exemplary embodiments, the heat exchanger assembly 102 may have still other suitable configurations. For example, referring now to FIG. 9, a heat exchanger assembly 102 in accordance with another exemplary embodiment of the present disclosure is provided. In the embodiment of FIG. 9, the heat exchanger assembly 102 may be configured in substantially the same manner as the heat exchanger assembly 102 described above with reference to FIG. 8.

For example, the exemplary heat exchanger assembly 102 depicted in FIG. 9 generally includes a structural backing 120 and a cooling unit. For the embodiment depicted, the cooling unit is a cooling tube 118. The cooling tube 118 is positioned adjacent to, and in thermal communication with, the inside surface 112 of the outer skin 40 for transferring heat from a thermal fluid flowing through the cooling tube 118, across the outer skin 40, to an ambient airflow over the outer skin 40. Further, the heat exchanger assembly 102 depicted in FIG. 9 includes an inflatable member 150 operable with the cooling tube 118 to the press the cooling tube 118 towards the inside surface 112 of the outer skin 40.

However, for the exemplary embodiment of FIG. 9, the inflatable member 150 is not located within the cooling tube 118, and instead is positioned between the cooling tube 118 and the structural backing 120. More specifically, for the embodiment shown, the heat exchanger assembly 102 further includes a load applicator 166 positioned between the inflatable member 150 and the cooling tube 118, as well as a first standoff member 168 and a second standoff member 170. For the embodiment shown, the first and second standoff members 168, 170 are resilient members, or springs, and extend from the load applicator 166 towards inside surface 112 of the outer skin 40. For the embodiment shown, the first and second standoff members 168, 170 are positioned on opposing sides of the first cooling tube 118 (e.g., along the circumferential direction C). The first and second standoff members 168, 170 may ensure a desired alignment of the cooling tube 118 with the inside surface 112 112 of the outer skin 40.

It will be appreciated, however, that in other exemplary embodiments, the first and second standoff members 168, 170 may be configured in any suitable manner. For example, in other exemplary embodiments, the first and/or second standoff member 168, 170 may be configured as a spring, such as a standard helical spring. With one or more of these configurations, the first and second standoff members 168, 170 may act to align the heat exchanger assembly 102 with the inside surface 112 of the outer skin 40.

Further for the embodiment shown, the load applicator 166 defines a channel 172, with the inflatable member 150 positioned at least partially within the channel 172. The inflatable member 150, as with the inflatable bladder discussed above, is configured to increase in volume when a pressurized airflow is provided thereto. As such, the inflatable member 150 may be deflated, as is depicted in phantom FIG. 9 as 150', during installation of the heat exchanger assembly 102, and subsequently inflated after installation of the heat exchanger assembly 102. The increase in volume of the inflatable member 150 may act to both press the cooling tube 118 against the inside surface 112 of the outer skin 40, to assist with molding the cooling tube 118 to the geometry of the inside surface 112 of the outer skin 40, and further to assist with installation of the heat exchanger assembly 102. In particular, the inflatable member 150 may be deflated during installation to allow for the heat exchanger assembly 102 to be moved into position between adjacent structural members (e.g., adjacent longitudinal stiffeners 116A, 116B; see FIG. 4) with relative ease, and then subsequently inflated to wedge the structural backing 120 in between adjacent structural members (e.g., adjacent longitudinal stiffeners 116A, 116B; see FIG. 4).

As is further depicted in FIG. 9, the heat exchanger assembly 102 additionally includes an adhesive 174 between the inside surface 112 of the outer skin 40 and at least one of the first standoff member 168, the second standoff member 170, or the cooling tube 118. Specifically, for the embodiment shown, the heat exchanger assembly 102 includes adhesive 174 between each of the inside surface 112 of the outer skin 40 and the first standoff member 168, the second standoff member 170, and the cooling tube 118. Such may assist with installation of the heat exchanger assembly 102 by allowing the heat exchanger assembly 102 to temporarily mounted in position using the adhesive 174 and to remain in position while, e.g., the inflatable member 150 is inflated and the structural backing 120 is attached to the structural members of the fuselage 20, e.g., wedged between adjacent first and second longitudinal stiffeners 116A, 116B.

In certain exemplary embodiments, the adhesive 174 may be a thermally conductive adhesive. For example, the adhesive 174 may be a double-sided tape, glue, etc. The adhesive 174 may have a thermal conductivity greater than about 1.0 Watts/meter-Kelvin, such as greater than about 1.5 Watts/meter-Kelvin.

It will further be appreciated that the configuration of FIG. 9 may further assist with accommodating relative thermal growth and contraction during operation of the aircraft 10. In particular, the adhesive may assist with accommodating relative thermal growth and contraction during operation of the aircraft 10

Figure 10:
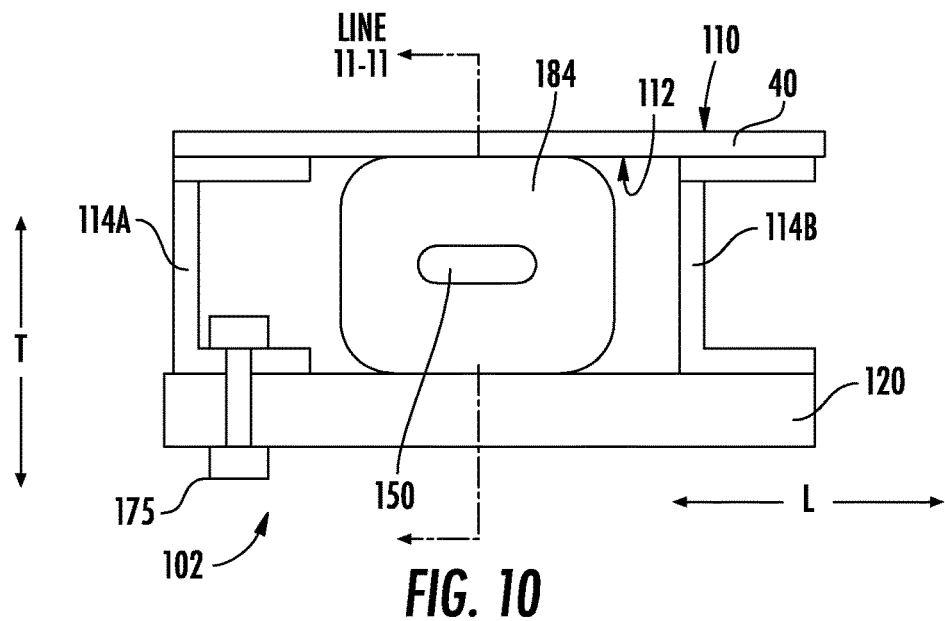
FIG. 10 is a schematic, cross-sectional view of a heat exchanger assembly in accordance with yet another exemplary embodiment of the present disclosure, viewed in the transverse and longitudinal directions.
Figure 11:
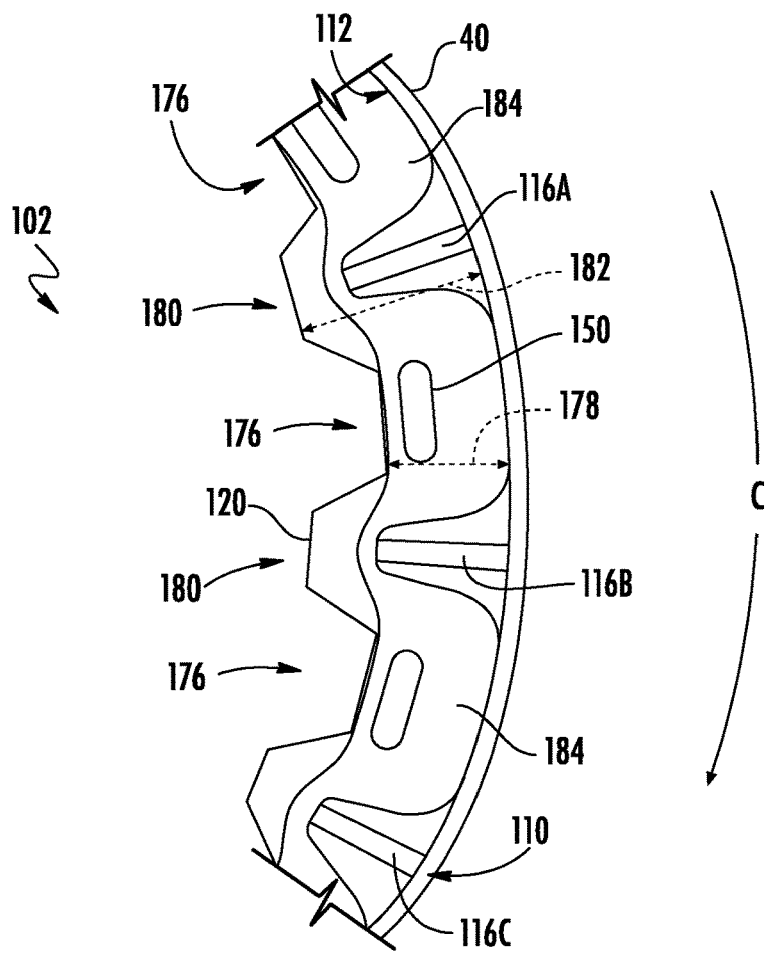
FIG. 11 is a schematic, cross-sectional view of the exemplary heat exchanger assembly of FIG. 10 taken along Line 11-11 in FIG. 10.

Referring now to FIGS. 10 and 11, close-up, cross-sectional views of a heat exchanger assembly 102 in accordance with yet an embodiment of the present disclosure are provided.

In particular, it will be appreciated that for the embodiment depicted, the heat exchanger assembly 102 includes a structural backing 120 extending along a longitudinal direction L between two structural members, and in particular between a first frame member 114A and a second frame member 114B (FIG. 10). In addition, the structural backing 120 extends across a plurality of structural members arranged substantially perpendicularly to the first and second frame members 114A, 114B, and more specifically, extends across a plurality of longitudinal stiffeners 116 (i.e., stiffeners 116A, 116B, 116C for the embodiment depicted in FIG. 11).

Referring particularly to FIG. 10, the structural backing 120 is coupled to the first frame member 114A, the second frame member 114B, or both. Specifically, for the embodiment shown, the structural backing 120 is coupled to the first frame member 114A. For the embodiment shown, the structural backing 120 is coupled to the first frame member 114A through a mechanical fastener 175. However, in other embodiments, the structural backing 120 may be coupled to the first frame member 114A in any other suitable manner.

Further, referring particularly to FIG. 11, it will be appreciated that for the exemplary heat exchanger assembly 102 depicted, the structural backing 120 is shaped to accommodate the various structural members of the structure within which the heat exchanger assembly 102 is installed. More specifically, for the embodiment shown the structural backing 120 defines a corrugated shape. More specifically still, the structural backing 120 includes a plurality of near sections 176 defining a first separation distance 178 from the inside surface 112 of the outer skin 40 and a plurality of far sections 180 defining a second separation distance 182 from the inside surface 112 of the outer skin 40. The first separation distance 178 is less than the second separation distance 182, such as at least about 10% less, such as at least about 20% less, such as up to about 90% less.

Further for the embodiment depicted, the corrugated shape of the structural backing 120 allows for the structural backing 120 to hold the cooling unit of the heat exchanger assembly 102 in position adjacent to, and in thermal communication with, the inside surface 112 of the skin 40. In particular, for the embodiment depicted in FIG. 11, the cooling unit of the heat exchanger assembly 102 is a cooling bladder 184 extending over a plurality of structural members, and in particular extending across longitudinal stiffeners 116A, 116B, 116C for the embodiment depicted in FIG. 11. For this embodiment, the near sections 176 of the structural backing 120 press the cooling bladder 184 toward the inside surface 112 of the skin 40 and the far sections 180 allow portions of the cooling bladder 184 to extend over the structural members.

Further still for the embodiment depicted, the cooling unit, or cooling bladder 184 for the embodiment shown, additionally includes a plurality of inflatable members 150 for pressing the cooling bladder 184 against the inside surface 112 of the skin 40, to increase a heat flux therebetween.

Figure 12:
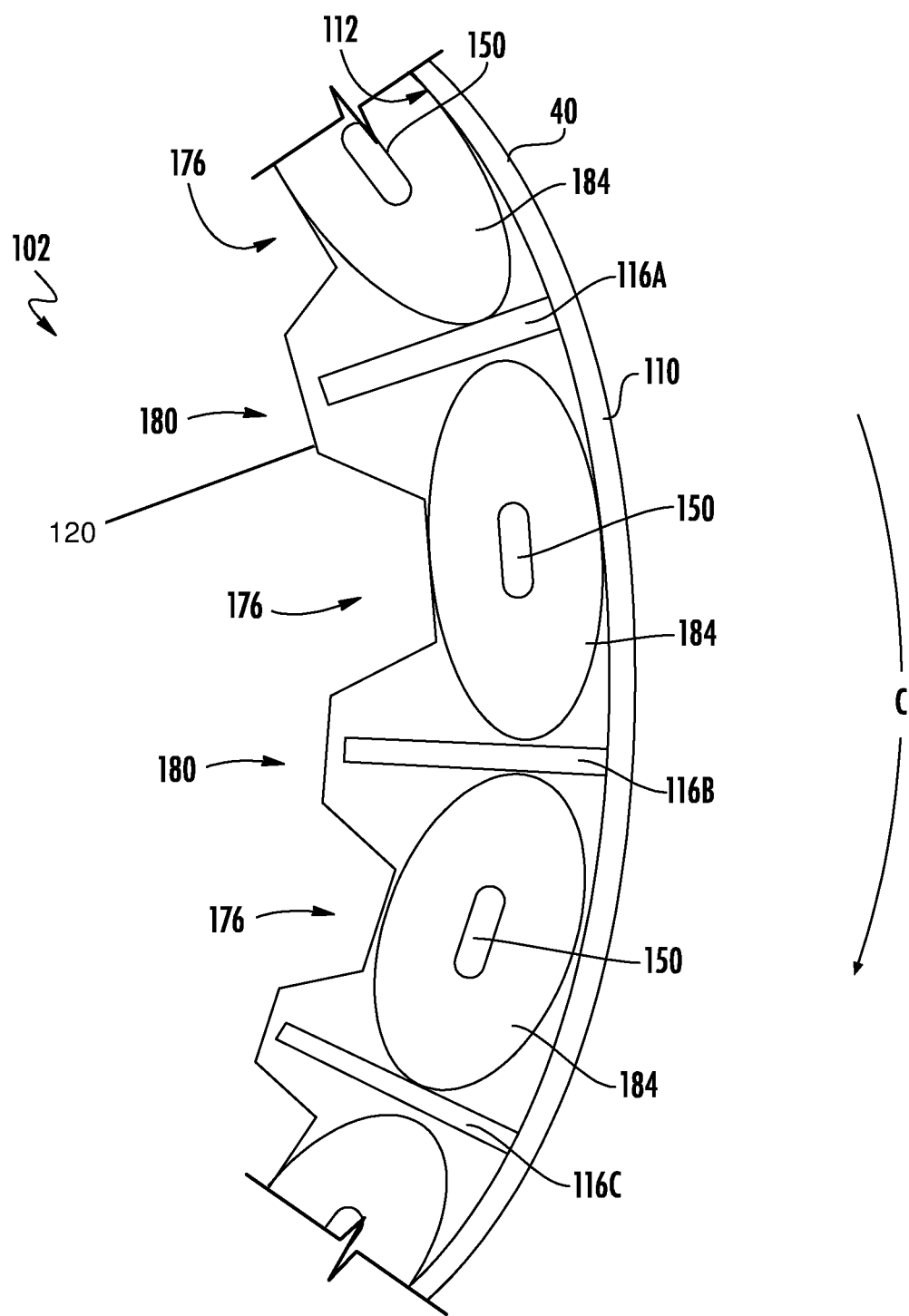
FIG. 12 is a schematic, cross-sectional view of a heat exchanger assembly of a thermal management system in accordance with yet another exemplary embodiment of the present disclosure.

However, in other embodiments, the heat exchanger assembly 102 may have still other configurations. For example, referring now to FIG. 12, a close-up, cross-sectional view of a heat exchanger assembly 102 in accordance with yet another embodiment of the present disclosure is provided. The heat exchanger assembly 102 depicted in FIG. 12 may be configured in a similar manner as the heat exchanger assembly 102 of FIG. 11. However, for the embodiment depicted, the heat exchanger assembly 102 includes a plurality of cooling units, or rather a plurality of cooling bladders 184, with each cooling bladder 184 positioned between adjacent structural members, such as between adjacent longitudinal stiffeners 116A, 116B, 116C.

It will be appreciated that although the exemplary thermal management systems 100 described above are described with reference to a fuselage 20 of an aircraft 10, in other exemplary embodiments the heat exchanger assembly(ies) of the thermal management system 100 may additionally or alternatively be positioned adjacent to, and in thermal communication with, an inside surface of a skin of any suitable structures of an aircraft 10. For example, in other exemplary embodiments, the thermal management system 100 may include one or more heat exchangers incorporated into a wing of an aircraft 10, a stabilizer of an aircraft 10, or additional structures, such as fairings, externally-mounted sponsons or pods, tail cones, engine nacelles, etc. For example, with respect to the wing configuration, the structural members may be a wing spar, nose ribs, rear ribs, etc. Additionally with such a configuration, the longitudinal and circumferential directions may be relative to the wing structure.

Further, in still other exemplary embodiments, the thermal management system 100 may be operable with other vehicles, such as marine vehicles (e.g., boats, submarines, etc.), land vehicles, space vehicles, etc.

In one or more of these embodiments, a heat exchanger assembly may be mounted between structural members that are relatively parallel to one another, such that they do not converge towards one another. In such cases, a structural backing of the heat exchanger assembly may be coupled to one or both of the structural members through any other suitable means, such as by bolting or other mechanical fastening, arrangement of complementary geometries (e.g., hooks, loops, ledges, etc.), adhesives, etc.

It will further be appreciated that although for the embodiments described above the heat exchanger assembly(ies) are described as being a heat sink heat exchanger to transfer heat from a thermal fluid through an outer skin to an ambient flow, in other embodiments, the heat flux may be reversed. For example, with certain configurations, the heat exchanger assembly(ies) of the thermal management system may be configured to absorb heat from the outer skin of the structure of the vehicle to reduce a temperature of the outer skin of the structure of the vehicle. For example, such may be incorporated into a supersonic or hypersonic aircraft to cool an outer skin of a structure of such aircraft.

Figure 13:
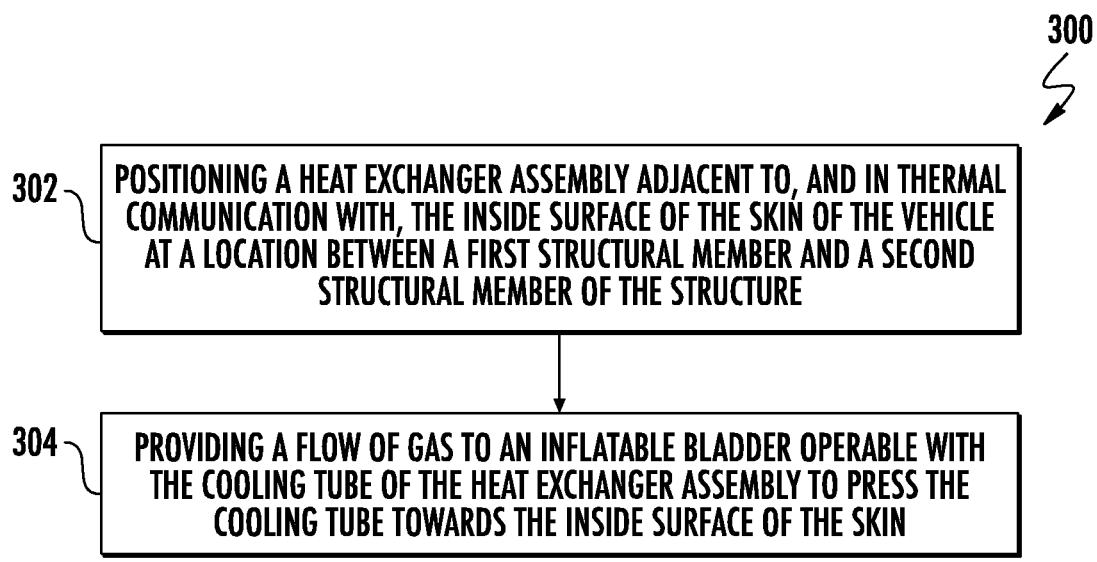
FIG. 13 is a flow diagram of a method for attaching a heat exchanger assembly of a thermal management system to an inside surface of a skin of a vehicle in accordance with an exemplary aspect of the present disclosure.

Referring now to FIG. 13, a method 300 of attaching a heat exchanger assembly of a thermal management system to an inside surface of the skin of the vehicle is provided. The heat exchanger assembly and thermal management system may be configured in any suitable manner. For example, in certain exemplary embodiments, the heat exchanger assembly in thermal management system may be configured in accordance with one or more the exemplary embodiments described above with reference to FIGS. 1 through 12. However, in other embodiments, the heat exchanger assembly and thermal management system may instead be configured in or as any other suitable manner.

The heat exchanger assembly and thermal management system may be attached to an inside surface of a skin of a structure of a vehicle.

The exemplary method 300 includes at (302) positioning a heat exchanger assembly adjacent to, and thermal communication with, the inside surface of the skin the vehicle at a location between a first structural member and a second structural member of the structure.

The exemplary method 300 further includes at (304) providing a flow of gas to an inflatable bladder operable with the cooling tube of the heat exchanger assembly to press the cooling tube towards the inside surface of the skin.

Figure 14:
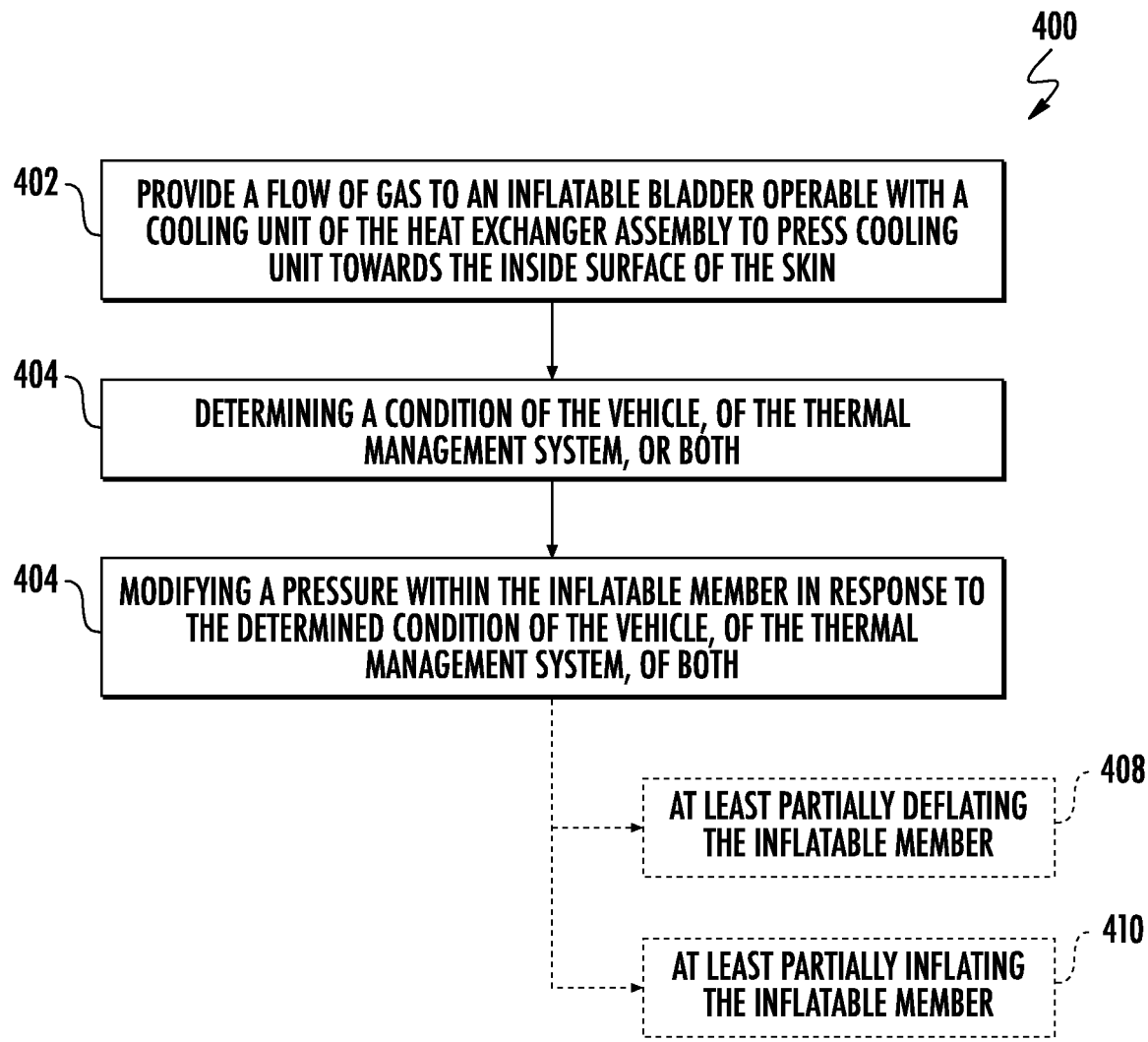
FIG. 14 is a flow diagram of a method for operating a heat exchanger assembly of a thermal management system operable with an inside surface of a skin of a vehicle in accordance with an exemplary aspect of the present disclosure.

Referring now to FIG. 14, a method 400 of operating a heat exchanger assembly of a thermal management system operable with an inside surface of the skin of the vehicle is provided. The heat exchanger assembly and thermal management system may be configured in any suitable manner. For example, in certain exemplary embodiments, the heat exchanger assembly in thermal management system may be configured in accordance with one or more the exemplary embodiments described above with reference to FIGS. 1 through 12. However, in other embodiments, the heat exchanger assembly and thermal management system may instead be configured in or as any other suitable manner.

The heat exchanger assembly and thermal management system may be attached to an inside surface of a skin of a structure of a vehicle. In particular, the heat exchanger assembly may be positioned adjacent to, and thermal communication with, the inside surface of the skin the vehicle.

The exemplary method 400 includes at (402) providing a flow of gas to an inflatable member operable with a cooling unit of the heat exchanger assembly to press cooling unit towards the inside surface of the skin. Additionally, the method 400 includes at (404) determining a condition of the vehicle, of the thermal management system, or both; and at (406) modifying a pressure within the inflatable member in response to the determined condition of the vehicle, of the thermal management system, or both.

For the exemplary aspect depicted, the condition determined at (404) may be an operating condition of the vehicle, of the thermal management system, or both. For example, the condition may be indicative of a flight stage of the aircraft (e.g., takeoff, climb, cruise, descent, taxi, etc.), whether or not one or more of the engines are operating and at what power level they are operating, whether or not the thermal management system is operating, a speed at which the aircraft is operating (e.g., subsonic, supersonic, hypersonic), etc.

Also for the exemplary aspect depicted, modifying the pressure within the inflatable member at (406) may include at (408) at least partially deflating the inflatable member or at (410) at least partially inflating the inflatable member. In such a manner, the method 400 may control a pressure the inflatable member applies to the heating unit of the heat exchanger assembly based at least in part on the one or more conditions of the vehicle, the thermal management system, or both in order to provide a desired amount of heat transfer when desired, without damaging the skin of the vehicle.

Further aspects of the invention are provided by the subject matter of the following clauses:

1. A vehicle including a structure including a skin defining an outside surface exposed to ambient cooling flow and an inside surface, the structure including a first structural member extending from the inside surface of the skin and a second structural member extending from the inside surface of the skin; and a thermal management system including a heat exchanger assembly positioned adjacent to, and in thermal communication with, the inside surface of the skin, the heat exchanger assembly positioned at least partially between the first and second structural members of the structure.

2. The vehicle of any of these clauses wherein the vehicle is an aircraft, and wherein the structure is a fuselage of the aircraft.

3. The vehicle of any of these clauses wherein the aircraft defines a longitudinal direction, wherein the first structural member is a first longitudinal stiffener extending generally along the longitudinal direction, and wherein the second structural member is a second longitudinal stiffener extending generally along the longitudinal direction.

4. The vehicle of any of these clauses wherein the first longitudinal stiffener defines a first reference line extending away from the inside surface of the skin, wherein the second longitudinal stiffener defines a second reference line extending away from the inside surface of the skin, wherein the first and second reference lines converge towards one another, and wherein the heat exchanger assembly includes a structural backing fixed at least partially between the first and second longitudinal stiffeners for mounting the heat exchanger assembly.

5. The vehicle of any of these clauses wherein the heat exchanger assembly is coupled to the first and second structural members of the structure.

6. The vehicle of any of these clauses wherein the heat exchanger assembly includes a structural backing and a cooling tube, wherein the structural backing mounts the cooling tube in position adjacent to, and in thermal communication with, the inside surface of the skin.

7. The vehicle of any of these clauses wherein the structural backing is mounted to the first structural member, the second structural member, or both.

8. The vehicle of any of these clauses wherein the cooling tube is formed of a flexible or semi rigid material.

9. The vehicle of any of these clauses wherein the cooling tube is formed of a composite having an additive for increased thermal conductivity.

10. The vehicle of any of these clauses wherein the cooling tube is formed of a filled polymer material.

11. The vehicle of any of these clauses wherein the heat exchanger assembly further includes an inflatable member operable with the cooling tube to press the cooling tube towards the inside surface of the skin.

12. The vehicle of any of these clauses wherein the inflatable member is an inflatable bladder positioned at least partially within the cooling tube.

13. The vehicle of any of these clauses wherein the inflatable member is positioned outside cooling tube between the cooling tube and the structural backing.

14. The vehicle of any of these clauses wherein the heat exchanger assembly further includes a load applicator positioned between inflatable member and the cooling tube, a first standoff member, and a second standoff member, and wherein the first and second standoff members are positioned on opposing sides of the cooling tube and extend from the load applicator towards the inside surface of the skin.

15. The vehicle of any of these clauses wherein the heat exchanger assembly defines a cooling air passage between the first standoff member, the cooling tube, and the inside surface of the skin.

16. The vehicle of any of these clauses wherein the heat exchanger assembly includes a thermally conductive substance between the inside surface of the skin and at least one of the first standoff member, the second standoff member, or the cooling tube.

17. The vehicle of any of these clauses wherein the heat exchanger assembly includes a thermally conductive adhesive between the inside surface of the skin and at least one of the first standoff member, the second standoff member, or the cooling tube.

18. The vehicle of any of these clauses wherein the cooling tube is arranged in a serpentine pattern adjacent to the inside surface of the skin.

19. The vehicle of any of these clauses wherein the structure further includes a third structural member extending from the inside surface of the skin, wherein the heat exchanger assembly is a first heat exchanger assembly, wherein the thermal management system further includes a second heat exchanger assembly, wherein the second heat exchanger assembly is positioned adjacent to, and in thermal communication with, the inside surface of the skin at a location between the second and third structural members of the structure, and wherein the first heat exchanger assembly is fluidly coupled to the second heat exchanger assembly.

20. The vehicle of any of these clauses wherein the heat exchanger assembly a cooling tube, and wherein the heat exchanger assembly defines a cooling air flowpath adjacent to, and in thermal communication with, the cooling tube.

21. The vehicle of any of these clauses wherein the heat exchanger assembly includes a cooling tube, wherein the cooling tube extends along a lengthwise direction and defines a first side proximate the inside surface of the skin and a second side opposite the first side, and wherein the cooling tube defines a plurality of nonlinear features spaced along the lengthwise direction on the first side.

22. The vehicle of any of these clauses further including: an engine, wherein the thermal management system of the vehicle is thermally coupled to a heat source of the engine for rejecting heat from the heat source using the heat exchanger assembly.

23. The vehicle of any of these clauses wherein the first structural member is a first frame member, wherein the second structural member is a second frame member, wherein the thermal management system includes a structural backing and a cooling unit, wherein the cooling unit is formed of an elastic or semi-rigid material to conform to a shape of the inside surface of the skin.

24. The vehicle of any of these clauses wherein the cooling unit is a cooling bladder configured to flow a thermal fluid therethrough.

25. The vehicle of any of these clauses wherein structure further includes a longitudinal stiffener extending between the first and second frame members, and wherein the cooling unit extends across the longitudinal stiffener.

26. A thermal management system for a vehicle, the vehicle including a structure having a skin defining an inside surface, a first structural member extending from the inside surface of the skin, and a second structural member extending from the inside surface of the skin, the thermal management system including: a heat exchanger assembly including a structural backing and a cooling tube, the structural backing configured to be mounted to the first structural member, the second structural member, or both, the structural backing further configured to mount the cooling tube in a position adjacent to, and in thermal communication with, the inside surface of the skin at a location between the first and second structural members.

27. A thermal management system for a vehicle, the vehicle including a structure having a skin defining an inside surface, the thermal management system including: a heat exchanger assembly including a structural backing and a cooling unit, the structural backing configured to mount the cooling unit in a position adjacent to, and in thermal communication with, the inside surface of the skin, the cooling unit formed of an elastic or semi-rigid material to conform to a shape of the inside surface of the skin.

28. The thermal management system of any of these clauses the cooling unit is a cooling tube.

29. The thermal management system of any of these clauses the cooling tube is formed of a composite having an additive for increased thermal conductivity.

30. The thermal management system of any of these clauses the heat exchanger assembly further includes an inflatable member operable with the cooling tube to press cooling tube towards the inside surface of the skin.

31. The thermal management system of any of these clauses the inflatable member is an inflatable bladder positioned at least partially within the cooling tube.

32. The thermal management system of any of these clauses the inflatable member is positioned outside the cooling tube and between the cooling tube and the structural backing.

33. The thermal management system of any of these clauses the heat exchanger assembly further includes a load applicator positioned between the inflatable member and the cooling tube, a first standoff member, and a second standoff member, and wherein the first and second standoff members are positioned on opposing sides of the cooling tube and extend from the load applicator towards the inside surface of the skin.

34. The thermal management system of any of these clauses the heat exchanger assembly defines a cooling air passage between the first standoff member, the cooling tube, and the inner surface of the skin.

35. The thermal management system of any of these clauses the heat exchanger assembly includes a thermally conductive adhesive between the inner surface of the skin and at least one of the first standoff member, the second standoff member, or the cooling tube.

36. The thermal management system of any of these clauses the cooling unit is a cooling bladder.

37. The thermal management system of any of these clauses the structure of the vehicle includes a structural member, and wherein the cooling bladder is configured to extend across the structural member.

38. The thermal management system of any of these clauses the structural member is a longitudinal stiffener, wherein the structure of the vehicle further includes a first frame member and a second frame member, wherein the longitudinal stiffener extends between the first and second frame members, wherein the structural backing is coupled to the first frame member and the second frame member.

39. The thermal management system of any of these clauses the heat exchanger assembly further includes an inflatable member operable with the cooling bladder to press cooling bladder towards the inside surface of the skin.

40. The thermal management system of any of these clauses the heat exchanger assembly further includes a plurality of inflatable members operable with the cooling bladder to press cooling bladder towards the inside surface of the skin.

41. The thermal management system of any of these clauses each of the plurality of inflatable members are positioned within the cooling bladder.

42. The thermal management system of any of these clauses the structural backing defines a corrugated shape having a plurality of near section and far sections relative to the outer skin.

43. A vehicle including: a structure including a skin defining an outside surface exposed to ambient cooling flow and an inside surface; and a thermal management system including a heat exchanger assembly including a structural backing and a cooling tube, the structural backing mounting the cooling tube in a position adjacent to, and in thermal communication with, the inside surface of the skin, the cooling tube formed of an elastic or semi-rigid material conforming to a shape of the inside surface of the skin.

44. A method of operating a heat exchanger assembly of a thermal management system operable with an inside surface of a skin of a vehicle including: providing a flow of gas to an inflatable member operable with a cooling unit of the heat exchanger assembly to press cooling unit towards the inside surface of the skin.

45. The method of any of these clauses further including: positioning a heat exchanger assembly adjacent to, and in thermal communication with, the inside surface of the skin of the vehicle at a location between a first structural member and a second structural member of the structure prior to providing the flow of gas to the inflatable member.

46. The method of any of these clauses further including: determining a condition of the vehicle, of the thermal management system, or both; and modifying a pressure within the inflatable member in response to the determined condition of the vehicle, of the thermal management system, or both.

47. The method of any of these clauses wherein the condition is an operating condition of the vehicle, of the thermal management system, or both.

48. The method of any of these clauses wherein modifying the pressure within the inflatable member includes at least partially deflating the inflatable member.

49. The method of any of these clauses wherein modifying the pressure within the inflatable member includes providing the flow of gas to the inflatable member operable with the cooling unit of the heat exchanger assembly to press cooling unit towards the inside surface of the skin.

50. The thermal management system of any preceding clause wherein the thermal fluid is air, a gas other than air; a liquid such as water, water-glycol mixtures, an oil such as a lubrication oil and/or thermal oil such as Syltherm, Dowtherm, etc.; fuel; a refrigerant (including $CO_2$, supercritical $CO_2$, and/or any other refrigerant, such as those having an "R" designation from the American Society of Heating, Refrigerating and Air-Conditioning Engineers); a functional equivalent of any of the above; and/or a combination of any of the above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A vehicle comprising:
an engine;
a structure comprising a skin defining an outside surface exposed to ambient cooling flow and an inside surface, the structure comprising a first structural member extending from the inside surface of the skin and a second structural member extending from the inside surface of the skin; and a thermal management system including a heat exchanger assembly positioned adjacent to, and in thermal communication with, the inside surface of the skin, the heat exchanger assembly positioned at least partially between the first and second structural members of the structure, wherein the thermal management system of the vehicle is thermally coupled to a heat source of the engine for rejecting heat from the heat source using the heat exchanger assembly;

wherein the heat exchanger assembly comprises:
a cooling tube; and
an inflatable member,
wherein the inflatable member is operable with the cooling tube to press the cooling tube towards the inside surface of the skin.

2. The vehicle of claim 1, wherein the vehicle is an aircraft, wherein the structure is a fuselage of the aircraft, wherein the aircraft defines a longitudinal direction, wherein the first structural member is a first longitudinal stiffener extending generally along the longitudinal direction, and wherein the second structural member is a second longitudinal stiffener extending generally along the longitudinal direction.

3. The vehicle of claim 2, wherein the first longitudinal stiffener defines a first reference line extending away from the inside surface of the skin, wherein the second longitudinal stiffener defines a second reference line extending away from the inside surface of the skin, wherein the first and second reference lines converge towards one another, and wherein the heat exchanger assembly includes a structural backing fixed at least partially between the first and second longitudinal stiffeners for mounting the heat exchanger assembly.

4. The vehicle of claim 1, wherein the heat exchanger assembly is coupled to the first and second structural members of the structure.

5. The vehicle of claim 1, wherein the heat exchanger assembly further includes a structural backing, wherein the structural backing mounts the cooling tube in position adjacent to, and in thermal communication with, the inside surface of the skin.

6. The vehicle of claim 5, wherein the inflatable member is positioned outside the cooling tube between the cooling tube and the structural backing, wherein the heat exchanger assembly further includes a load applicator positioned between inflatable member and the cooling tube, a first standoff member, and a second standoff member, and wherein the first and second standoff members are positioned on opposing sides of the cooling tube and extend from the load applicator towards the inside surface of the skin.

7. The vehicle of claim 1, wherein the first structural member is a first frame member, wherein the second structural member is a second frame member, wherein the thermal management system comprises a structural backing and a cooling unit, wherein the cooling unit is formed of an elastic or semi-rigid material to conform to a shape of the inside surface of the skin.

8. The vehicle of claim 7, wherein the structure further comprises a longitudinal stiffener extending between the first and second frame members, and wherein the cooling unit extends across the longitudinal stiffener.

9. A vehicle comprising:
a structure having a skin defining an inside surface; and
a thermal management system comprising:
a heat exchanger assembly comprising a structural backing and a cooling unit, the structural backing configured to mount the cooling unit in a position adjacent to, and in thermal communication with, the inside surface of the skin, the cooling unit formed of an elastic or semi-rigid material to conform to a shape of the inside surface of the skin,
wherein the cooling unit is a cooling tube,
wherein the heat exchanger assembly further includes an inflatable member operable with the cooling tube to press the cooling tube towards the inside surface of the skin, and
wherein the inflatable member is positioned outside the cooling tube and between the cooling tube and the structural backing.

10. The vehicle of claim 9, wherein the heat exchanger assembly further includes a load applicator positioned between the inflatable member and the cooling tube, a first standoff member, and a second standoff member, and wherein the first and second standoff members are positioned on opposing sides of the cooling tube and extend from the load applicator towards the inside surface of the skin.

11. The vehicle of claim 10, wherein the heat exchanger assembly defines a cooling air passage between the first standoff member, the cooling tube, and the inside surface of the skin.

12. A vehicle comprising:
a structure comprising a skin defining an outside surface exposed to ambient cooling flow and an inside surface, the structure comprising a first structural member extending from the inside surface of the skin and a second structural member extending from the inside surface of the skin; and
a thermal management system including a heat exchanger assembly positioned adjacent to, and in thermal communication with, the inside surface of the skin, the heat exchanger assembly positioned at least partially between the first and second structural members of the structure,
wherein the heat exchanger assembly comprises:
a cooling tube; and
an inflatable member,
wherein the inflatable member is operable with the cooling tube to press the cooling tube towards the inside surface of the skin.

13. The vehicle of claim 12, wherein the vehicle is an aircraft, wherein the structure is a fuselage of the aircraft, wherein the aircraft defines a longitudinal direction, wherein the first structural member is a first longitudinal stiffener extending generally along the longitudinal direction, and wherein the second structural member is a second longitudinal stiffener extending generally along the longitudinal direction.

14. The vehicle of claim 13, wherein the first longitudinal stiffener defines a first reference line extending away from the inside surface of the skin, wherein the second longitudinal stiffener defines a second reference line extending away from the inside surface of the skin, wherein the first and second reference lines converge towards one another, and wherein the heat exchanger assembly includes a structural backing fixed at least partially between the first and second longitudinal stiffeners for mounting the heat exchanger assembly.

15. The vehicle of claim 12, wherein the heat exchanger assembly is coupled to the first and second structural members of the structure.

16. The vehicle of claim 12, wherein the heat exchanger assembly includes a structural backing, wherein the structural backing mounts the cooling tube in position adjacent to, and in thermal communication with, the inside surface of the skin.

17. The vehicle of claim 16, wherein the inflatable member is positioned outside the cooling tube between the cooling tube and the structural backing, wherein the heat exchanger assembly further includes a load applicator positioned between inflatable member and the cooling tube, a first standoff member, and a second standoff member, and wherein the first and second standoff members are positioned on opposing sides of the cooling tube and extend from the load applicator towards the inside surface of the skin.

18. The vehicle of claim 12, further comprising:
an engine, wherein the thermal management system of the vehicle is thermally coupled to a heat source of the engine for rejecting heat from the heat source using the heat exchanger assembly.

19. The vehicle of claim 12, wherein the first structural member is a first frame member, wherein the second structural member is a second frame member, wherein the thermal management system comprises a structural backing and a cooling unit, wherein the cooling unit is formed of an elastic or semi-rigid material to conform to a shape of the inside surface of the skin.

20. The vehicle of claim 19, wherein the structure further comprises a longitudinal stiffener extending between the first and second frame members, and wherein the cooling unit extends across the longitudinal stiffener.

* * * * *